United States Patent Office 2,894,849
Patented July 14, 1959

2,894,849

ALPHA, GAMMA DIKETONES IN COMBINATION WITH METALLO-ORGANIC DRIERS AS DRYING ACCELERATORS FOR SICCATIVE COATINGS

Oliver J. Grummitt and James A. Stearns, Cleveland, Ohio, assignors to The Sherwin-Williams Company, Cleveland, Ohio, a corporation of Ohio No Drawing. Application May 20, 1957
Serial No. 660,072

23 Claims. (Cl. 106—310)

This invention is related to synergistic compositions useful in combination to activate or promote increase in the drying rate of drying oil group containing siccative coatings.

More particularly, the present invention is directed to the combination of an organic soap or salt of a cation including lead, cobalt and manganese plus a quantity of an alpha, gamma diketone of the structure

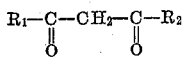

where $R_1$ may be an alkyl, aryl, alkaryl or cyclic group and $R_2$ is an aliphatic group, halogen substituted where $R_1$ contains an aryl group and preferably fluorine substituted in any case.

It is a general object of the invention to provide means of activating or promoting the siccative action of organo-metallic paint driers by inclusion with said driers in drying oil containing coatings a quantity of an alpha gamma d-substituted diketone of the general structure

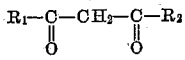

where $R_1$ is an organic ring group when $R_2$ is halogen substituted aliphatic group and when $R_1$ is an aliphatic group $R_2$ is either halogen substituted or non-substituted, sufficient to increase the normal drying rate of the paint drier siccative coating composition.

It is a further specific object of this invention to provide a new composition of matter which comprises an organometallic paint drier and a di-substituted alpha, gamma diketone wherein one substitutent group is an organic ring and a second substituent group is an aliphatic chain, preferably halogen substituted.

Other specific objects of the invention will be apparent from the illustrative examples and more detailed description of the invention which follows.

It has long been known that certain metals in the form of oil soluble salts and soaps when present in drying oil fatty acid group containing coating compositions in catalytic amounts of the order of .001% to about 1% of metal on the solid or film-forming portion of paints, oils and varnishes accelerate the rate of transformation of films of such coatings from a sol to a gel state.

Standard driers almost universal in use include lead, cobalt and manganese as cations of salts and soaps of fatty acids containing eight or more carbon atoms. The physical structure of the organic acidic portion of the organo-metallic driers is not generally critical, for aliphatic acids, aromatic acids, heterocyclic acids and alkyl aryl acids have been used to solubilize the metal and to provide the metallic ion essential to the acceleration of drying of films containing drying oil fatty acid groups. It is fairly well established that the primary function of the organic portion of the molecule is to provide solubility in the coating composition. Of lesser importance, but non-the-less useful as organo-metallic driers, are the corresponding salts and soaps of iron, calcium, zinc and zirconium. The term organo-metallic or metallo-organic paint drier as used herein includes the above illustrated classes of material and their equivalents.

In relatively recent years it has been found that the standardly used metallic paint driers described above can be further enhanced in their usefulness in promoting the drying of protective and decorative coatings containing drying oil, or unsaturated, groups by including with them certain organic compounds which act synergistically when in combination with coatings. It is known that certain purely organic compounds will increase the drying rate of drying oil containing coatings. It is equally well known that other pure organic compounds, some of relatively similar chemical nature, will retard the drying rate of paint-like siccative compositions. Illustratively, it is known that dicyclopentadiene peroxide will accelerate the drying rate of paints and varnishes (see U.S. 2,494,418), while phenols, amines and oximes in general will retard paint drying. However, no hard and fast rule has been formulated and a number of exceptions to general rule of behavior of certain classes of compounds are known. To illustrate, while phenols as a class behave negatively, or retard drying, certain tetrachlorophenols are known to be drying accelerators and have been used for that purpose for many years.

In the present invention, the selectivity of useful compounds in the same general class must be relatively closely drawn. We have found, for example, that dibenzoyl methane

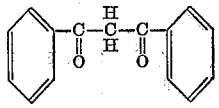

while extremely closely related to the useful class of promotors or activators of and for organo-metallic driers in paint systems, retards drying of paint and varnish films containing organo-metallic driers. Tests employing about 0.03% manganese naphthenate on the film-forming solids failed to reveal any synergism in drying rate improvement of a standard varnish using dibenzoyl methane.

Even more closely related to the alpha, gamma diketones previously described as useful for the purposes of this invention is benzoyl acetone of the structure

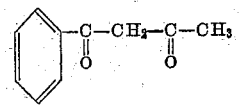

Extensive testing has established benzoyl acetone to be ineffective as an accelerator or activator in combination with metallo-organic driers. On the other hand, acetyl acetone

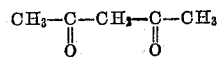

is effective for the purposes of the invention and tests have indicated a 12 to 24% increase in the rate of dry of a test coating with as compared with similar tests without the adjuvant. Note from this that if one terminal substituent is an aryl group, the other terminal substituent cannot be an unsubstituted aliphatic group. Further investigation of compounds closely related in structure has established that benzoyl trifluoroacetone,

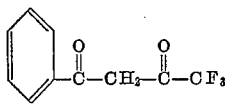

aromatic substituent at one end and aliphatic at the other end of the molecule but halogen substituted in the aliphatic group, is extremely effective as an accelerator of the drying rate of paint films. Trifluoroacetyl acetone,

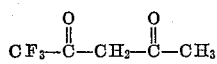

is also an efficient and effective promoter. Increased halogen substitution as in hexafluoroacetyl acetone,

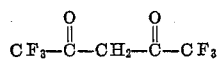

appears to intensify the activity of the drying promoter, increases of the order of 40% in drying efficiency or drying rate have been recorded.

Check on the halogen substituent in the promoter molecule has indicated that fluorine appears more active than chlorine, but that chlorine for hydrogen also increases the usefulness for the purposes of the invention.

Monoketones, even when fluorine substituted, indicate little promise. Trifluoroacetophenone

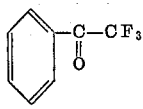

demonstrates no activity.

Summarizing test results only alpha, gamma diketones of the general structure

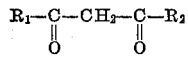

where $R_1$ and $R_2$ are selected from the group consisting of organic single ring, not fused rings, radicals and organic lower aliphatic radicals where, when $R_1$ is a single ring group $R_2$ is a halogen substituted lower aliphatic group, but where $R_1$ is a lower aliphatic group $R_2$ is also a lower aliphatic group, preferably a methyl group. It is preferred that the lower aliphatic groups in any case be halogenated and of the halogens, fluorine is preferred. Metallo-organic paint driers must be present to obtain the increase in drying rate, and, in all cases effective results are obtained if at least a manganese drier is present. Not all the other driers are effective alone in all cases. Most often in the paint art blends of cobalt, manganese and lead driers are used in combination, for each of these metal cations appear to possess a unique province of use in accelerating the drying of paint films, and in general the most favorable results are obtained with the combinations of this invention where all three of the commonly used cobalt, lead and manganese driers are present.

From general experience in evaluation of paint driers and compounds suitable to promote or activate the drying rate of drying oil fatty acid group containing coatings a long oil (50–60% oil on the basis of the resin) modified alkyd resin made by alcoholysis of linseed oil with pentaerythritol and esterified in part with a maleic-anhydride rosin addition compound cut with mineral spirits was found to be representative. In other words, if a drier under test or an accelerator or promoter or activator of the rate of drying of a coating performed positively in this vehicle, similar results were correlatively obtained with other drying oil group containing vehicles all the way from alkali refined linseed oil, heat-bodied drying oils having iodine values (before treatment) of 120 or more, through the natural and synthetic types of oleoresinous vehicles commonly employed in the protective and decorative coatings art.

As room conditions vary from day to day all drying tests were run on films of standard thickness (about 0.003 inch thick) on glass plates. Parallel series of panels were always run for direct comparison with and without the various additives under test. In preparation of samples for test, various combinations of metal driers at various concentrations were combined with the test varnish vehicle described above. Both the octoate and the naphthenate salts were checked out in comparative tests with little difference noted. Prepared test mixtures of varnish, drier solution and additive diketone (or other test substance) were allowed to age 24 hours in closed test tubes before drying tests on 0.003 inch draw-down sample films were prepared. Samples were also retained of the mixture for 60 days so that effectiveness of the sample could be observed after ageing.

In each metallo-organic drier use, a standard percentage of metal ion is present based upon the non-volatile content of the vehicle. These percentages were selected as representative of custom and use in the field to which this invention pertains. The lead drier was at a 0.5% level, the cobalt drier at a 0.05% level and the manganese drier at a 0.03%. The percentage reduction in dry-to-touch time was based on the time required for films containing no diketone, or similar additive, to dry to that state under comparative conditions. The dry-to-touch time, as used herein, is the time elapsed between film draw-down and the time when the degree of solidification of the deposited film is such that a light touch of a finger of the film removes none of the surface of the film.

EXAMPLE I 100 parts of the representative varnish used for comparative testing comprising a 50% solids long oil linseed-pentaerythritol-maleic rosin varnish was blended with 0.5% lead, 0.05% cobalt and 0.03% manganese as the naphthenates based on the metal cation. Additionally, 0.4% of acetyl acetone,

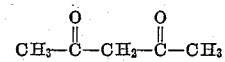

was added to an aliquot portion of the varnish sample. After 24 hours age of the blend, 0.003 inch draw-downs on glass were studied as to drying rate. The aliquot sample containing the acetyl acetone showed slight acceleration in drying rate over its comparative film strip. After 60 days' age the samples were again compared. The sample containing the added diketone dried-to-touch about 20% faster than the standard film. Duplicate series containing a variety of metallo-organic drier combinations with acetyl acetone demonstrated increase in drying rate from about 12 to 24% over the standard, depending upon the particular drier combination selected. If no drier is present but only acetyl acetone, no change in rate of dry is observed.

EXAMPLE II

A series of tests, similar to the above, were performed on a variety of available diketones to survey their potential usefulness as activators for paints systems.

| Ketone (0.4% on varnish solids) | Driers (as previously noted) | Percent Reduction in Dry-to-Touch Time |
|---|---|---|
| (a) benzoylacetone<br>$\text{C}_6\text{H}_5-\text{C}(\text{O})-\text{CH}_2-\text{C}(\text{O})-\text{CH}_3$ | Co<br>Mn<br>Pb | No useful effect after 24 hours or 60 days. |
| (b) dibenzoyl methane<br>$\text{C}_6\text{H}_5-\text{C}(\text{O})-\text{CH}_2-\text{C}(\text{O})-\text{C}_6\text{H}_5$ | Pb<br>Co<br>Mn | Do. |
| (c) thenoyltrifluoroacetone<br>$\text{(thienyl)}-\text{C}(\text{O})-\text{CH}_2-\text{C}(\text{O})-\text{CF}_3$ | Pb<br>Co<br>Mn | 27% reduction over standard at 24 hours; 29% reduction over standard at 60 days age. |
| (d) trifluoroacetylacetone<br>$\text{CF}_3-\text{C}(\text{O})-\text{CH}_2-\text{C}(\text{O})-\text{CH}_3$ | Pb<br>Mn | 12% reduction at 24 hours; 17% reduction at 60 days. |
| (e) hexafluoroacetylacetone<br>$\text{CF}_3-\text{C}(\text{O})-\text{CH}_2-\text{C}(\text{O})-\text{CF}_3$ | Mn | 45% reduction at 24 hours; 37% reduction at 60 days age. |
| (f) furoyltrifluoroacetone<br>$\text{(furyl)}-\text{C}(\text{O})-\text{CH}_2-\text{C}(\text{O})-\text{CF}_3$ | Mn | 43% reduction after 24 hours. |
| (g) benzoyltrifluoroacetone<br>$\text{C}_6\text{H}_5-\text{C}(\text{O})-\text{CH}_2-\text{C}(\text{O})-\text{CF}_3$ | Co<br>Mn | 44% reduction after 24 hours age. |
| (h) benzoyldichloroacetone<br>$\text{C}_6\text{H}_5-\text{C}(\text{O})-\text{CH}_2-\text{C}(\text{O})-\text{CHCl}_2$ | Co<br>Mn | 19% reduction after 24 hours age. |
| (i) 5,5-dimethyl-1,3-cyclohexanedione | Co<br>Mn<br>Pb | 25% reduction after 24 hours; 16% reduction after 60 days age. |

EXAMPLE III

Each of the diketone promoters of Example II was tested in a series of tests using one, two and three of the metallo-organic driers, lead naphthenate, cobalt naphthenate and manganese naphthenate at 0.5%, 0.05% and 0.03% metal on the varnish solids, respectively. A considerable amount of variation in the percentage acceleration of drying of the control varnish was observed. When only one metal drier was used, manganese seemed to be consistently superior to any one other single metal drier. Combinations of lead, cobalt and manganese driers at the percentages shown gave consistent positive increase in drying rate acceleration in all tests.

Cobalt driers, alone, gave inconsistent results, and unless some manganese drier was present, negative results (e.g. actual retardation in drying rate) was observed in some trials. Generally speaking, lead and manganese in combination gave marked increase in acceleration of drying rate as did the combination of all three of the standard driers. Variation in acceleration rate with the various combinations of metallo-organic driers at various metal drier percentage levels indicated that in instances where maximum effect was desired, a preliminary ladder determining the most desirable percentage level and metallo-organic level for any given vehicle system would be worthy of consideration.

Table 1

The following table is illustrative of a series of experiments, as described above, adding 0.4% of benzoyltrifluoroacetone to aliquot portions of a standard varnish prepared with a variety of combinations of lead, cobalt and manganese octoate driers as compared with the same varnish containing no drier.

| Experiment Number | Driers | | | Percent Reduction in Dry-to-Touch Time After 24 Hours Age |
|---|---|---|---|---|
| | 0.5% | 0.05% | 0.03% | |
| 1 | | None | | 0 |
| 2 | | Co | | 11 |
| 3 | Pb | Co | | 12 |
| 4 | Pb | Co | Mn | 21 |
| 5 | Pb | | Mn | 22 |
| 6 | | Co | Mn | 35 |
| 7 | | | Mn | 44 |
| 8 | Pb | | | 14 |

From preparations of similar series, it was observed that manganese alone was most active in conjunction with the organic diketones described. A stock solution was made in accordance with the following example.

EXAMPLE IV

| | Parts |
|---|---|
| Manganese naphthenate (6% solution in mineral spirits) | 500 |
| Benzoyltrifluoroacetone | 400 |

This stock solution was used in adding manganese metal plus activator in production of a variety of protective and decorative coatings containing drying oil fatty acid groups.

EXAMPLE V

| | Parts |
|---|---|
| 24% lead naphthenate | 210 |
| 6% cobalt naphthenate | 90 |
| 6% manganese naphthenate | 50 |
| Benzoyltrifluoroacetone | 50 |

This stock solution was used in manufacture of drying oil containing coatings which dried predominantly by oxidation and polymerization. The solution served as a convenient source of metallo-organic drier catalyst as well as promoter. When the metals were added from this source a marked increase in drying rate was obtained. That there is synergistic activity between the metallo-organic siccatives and the alpha, gamma di-substituted ketones as described is apparent from the fact that the driers alone, or the diketone alone, would not catalyze the drying of a standard paint film at the same rate as when the two materials were used in combination.

Quantities of the herein described ketones, based on the film-forming solids in the coating, were varied from 0.05% to in excess of 0.5% with positive synergistic effect observable in each instance. Quantities above 5% are wasteful with no observable benefit above about 0.5%. Below 0.01% the activity of the diketone falls off rapidly. Little difficulty has been experienced in determining an optimum amount of the additive to use, once the combination of metals one elects has been made, to enhance the rate of dry of drying oil group containing paints and varnishes.

Having described the metes and bounds of our invention and illustrated it by selected examples, we claim:

1. A composition of matter, useful in catalytic quantity to accelerate the drying rate of siccative films, which composition consists essentially of an oil soluble metal soap paint drier and an alpha, gamma diketone to the general structure $$R_1-\underset{\underset{O}{\|}}{C}-CH_2-\underset{\underset{O}{\|}}{C}-R_2$$

where $R_1$ and $R_2$ are selected from the group consisting of organic single ring radicals and organic lower aliphatic radicals where, when $R_1$ is a single ring group $R_2$ is a halogen substituted lower aliphatic group, but where $R_1$ is a lower aliphatic group $R_2$ is also a lower aliphatic group.

2. A composition of matter, useful in catalytic quantity to accelerate the drying rate of siccative films consisting essentially of an oil soluble metal soap paint drier and a drier promoter consisting essentially of a lower aliphatic alpha, gamma disubstituted diketone wherein at least one of the lower aliphatic groups thereof is halogen substituted.

3. The composition of claim 2, wherein the halogen substituent of the lower aliphatic group is fluorine.

4. The composition of claim 2, wherein both of the lower aliphatic groups of the lower aliphatic diketone are fluorine substituted.

5. The composition of claim 2 wherein both of the lower aliphatic groups are methyl groups.

6. The composition of claim 2 wherein both of the lower aliphatic groups are fluorine substituted methyl groups.

7. The composition of claim 1 wherein $R_1$ is a phenyl group and $R_2$ is a halogenated lower aliphatic group.

8. The composition of claim 1 wherein $R_1$ is a single heterocyclic ring group and $R_2$ is a halogenated lower aliphatic group.

9. The composition of claim 8 wherein $R_1$ is a thienyl ring group.

10. The composition of claim 8 wherein $R_1$ is a furyl ring group.

11. The composition of claim 8 where $R_2$ is a fluorine substituted lower aliphatic group.

12. The composition of claim 8 where $R_2$ is a fluorine substituted methyl group.

13. The composition of claim 1 wherein $R_1$ is a thienyl group and $R_2$ is a fluorine substituted methyl group.

14. The composition of claim 1 wherein $R_1$ is a furan ring and $R_2$ is a fluorine substituted methyl group.

15. The composition of claim 1 wherein $R_1$ is a phenyl group and $R_2$ is a fluorine substituted methyl group.

16. The composition of claim 1 wherein $R_1$ is a phenyl group and $R_2$ is a chlorine substituted methyl group.

17. A liquid coating composition consisting essentially of a major amount of a drying oil fatty acid group containing liquid siccative film-forming composition and a minor amount of an oil soluble metal soap paint drier and an alpha, gamma diketone of the general structure $$R_1-\underset{\underset{O}{\|}}{C}-CH_2-\underset{\underset{O}{\|}}{C}-R_2$$

where $R_1$ and $R_2$ are selected from the group consisting of organic single ring radicals and organic lower aliphatic radicals where, when $R_1$ is a single ring group $R_2$ is a halogen substituted lower aliphatic group, but where $R_1$ is a lower aliphatic group $R_2$ is also a lower aliphatic group.

18. A method of accelerating the drying rate of drying oil fatty acid group containing liquid siccative film-forming compositions containing oil-soluble metal soap paint driers which comprises incorporating in said liquid compositon a quantity of an alpha, gamma diketone of the $$R_1-\underset{\underset{O}{\|}}{C}-CH_2-\underset{\underset{O}{\|}}{C}-R_2$$

where $R_1$ and $R_2$ are selected from the group consisting of organic single ring radical and organic lower aliphatic radicals where, when $R_1$ is a single ring group $R_2$ is a halogen substituted lower aliphatic group, but where $R_1$ is a lower aliphatic group $R_2$ is also a lower aliphatic group, sufficient to enhance the drying rate of said composition in film form.

19. A composition of matter consisting essentially of an oil soluble metal soap paint drier containing a manganese metal ion and benzoyl trifluoroacetone.

20. A composition of matter consisting essentially of an oil soluble metal soap paint drier containing a manganese metal ion and benzolyl trifluoroacetone.

21. A composition of matter consisting essentially of an oil soluble metal soap paint drier containing a manganese metal ion and trifluoroacetylacetone.

22. A composition of matter consisting essentially of an oil soluble metal soap paint drier containing a manganese metal ion and furoyltrifluoroacetone.

23. A composition of matter consisting essentially of an oil soluble metal soap paint drier containing a manganese metal ion and hexafluoroacetylacetone.

References Cited in the file of this patent

UNITED STATES PATENTS

| | | |
|---|---|---|
| 2,330,337 | Cupery | Sept. 28, 1943 |
| 2,360,283 | Rutherford | Oct. 10, 1944 |
| 2,793,962 | Collins | May 28, 1957 |
| 2,794,049 | Thompson | May 28, 1957 |

UNITED STATES PATENT OFFICE
CERTIFICATE OF CORRECTION

Patent No. 2,894,849                     July 14, 1959

Oliver J. Grummitt et al.

It is hereby certified that error appears in the printed specification of the above numbered patent requiring correction and that the said Letters Patent should read as corrected below.

Column 1, line 62, for "solid" read -- solids --; column 4, line 47, for "of", first occurrence, read -- to --; column 8, line 28, for "radical" read -- radicals --; line 36, for "benzoyl" read -- thenoyl --; line 39, for "benzolyl" read -- benzoyl --.

Signed and sealed this 20th day of September 1960.

(SEAL)
Attest:

KARL H. AXLINE
Attesting Officer

ROBERT C. WATSON
Commissioner of Patents